US012562513B2

(12) United States Patent
Dyck

(10) Patent No.: US 12,562,513 B2
(45) Date of Patent: Feb. 24, 2026

(54) SPRING-FORCE CLAMPING CONNECTION, CONDUCTOR TERMINAL, AND METHOD FOR MANUFACTURING A SPRING-FORCE CLAMPING CONNECTION

(71) Applicant: WAGO Verwaltungsgesellschaft mbH, Minden (DE)

(72) Inventor: Tobias Dyck, Rahden (DE)

(73) Assignee: Wago Verwaltungsgesellschaft mbH, Minden (DE)

( * ) Notice: Subject to any disclaimer, the term of this patent is extended or adjusted under 35 U.S.C. 154(b) by 410 days.

(21) Appl. No.: 18/224,282

(22) Filed: Jul. 20, 2023

(65) Prior Publication Data

US 2024/0030626 A1 Jan. 25, 2024

(30) Foreign Application Priority Data

Jul. 22, 2022 (DE) ..................... 10 2022 118 427.7

(51) Int. Cl.
*H01R 4/48* (2006.01)

(52) U.S. Cl.
CPC ....... *H01R 4/4848* (2023.08); *H01R 4/48365* (2023.08); *H01R 4/484* (2023.08)

(58) Field of Classification Search
CPC ... H01R 4/484; H01R 4/4848; H01R 4/48365
USPC .................................................. 439/729, 441
See application file for complete search history.

(56) References Cited

U.S. PATENT DOCUMENTS

| | | | | |
|---|---|---|---|---|
| 6,814,608 | B2 | 11/2004 | Kollmann | |
| 8,858,269 | B2 * | 10/2014 | Brand | H01R 4/4852 439/733.1 |
| 11,223,145 | B2 | 1/2022 | Wendt et al. | |
| 2021/0066824 | A1 * | 3/2021 | Wendt | H01R 25/14 |

FOREIGN PATENT DOCUMENTS

| | | | |
|---|---|---|---|
| DE | 102010015457 | A1 | 10/2011 |
| DE | 202012103987 | U1 | 2/2014 |
| DE | 202019104688 | U1 | 12/2020 |
| EP | 1391965 | B1 | 1/2009 |

OTHER PUBLICATIONS

DIN Standard; "Joining manufacturing process"; Sep. 2003; Technical Fundamentals Standards Committee (NATG).

* cited by examiner

*Primary Examiner* — Tulsidas C Patel
*Assistant Examiner* — Thaslimur Rahman
(74) *Attorney, Agent, or Firm* — Muncy, Geissler, Olds & Lowe, P.C.

(57) ABSTRACT

A spring-force clamping connection, including a busbar, which spans a busbar plane and has a through-opening, and including a clamping spring a separate sleeve having a sleeve wall being present, which extends from an inlet to an outlet of the sleeve in a sleeve longitudinal direction. The separate sleeve being inserted into the through-opening in the sleeve longitudinal direction transversely to the busbar plane. The sleeve wall having an outer circumferential contour, which, in the state of the sleeve inserted into the through-opening, abuts an inner circumferential contour of the through-opening, and the sleeve being connected to the busbar.

22 Claims, 17 Drawing Sheets

SPRING-FORCE CLAMPING CONNECTION, CONDUCTOR TERMINAL, AND METHOD FOR MANUFACTURING A SPRING-FORCE CLAMPING CONNECTION

This nonprovisional application claims priority under 35 U.S.C. § 119(a) to German Patent Application No. 10 2022 118 427.7, which was filed in Germany on Jul. 22, 2022, and which is herein incorporated by reference.

BACKGROUND OF THE INVENTION

Field of the Invention

The invention relates to a spring-force clamping connection including a busbar, which spans a busbar plane and has a through-opening, and a clamping spring.

The invention furthermore relates to a conductor terminal including an insulating housing and a spring-force clamping connection in the insulating housing.

The invention also relates to a method for manufacturing a spring-force clamping connection.

Description of the Background Art

Spring-force clamping connections are used to clamp electrical conductors to a busbar with the aid of a clamping spring. The electrical conductor may be electrically conductively connected to the busbar thereby and held mechanically at the spring-force clamping connection by the spring force.

EP 1 391 965 B1, which corresponds to US 2004/0077210, which is incorporated herein by reference, discloses a spring-force clamping connection for an electrical conductor, in which the busbar has a four-cornered material passage, which has a perforated collar, closed in a ring shape, which has perforated collar inner wall surfaces and is pulled through from the upper side of the busbar. A material passage of this type is integrally manufactured by a forming method from the busbar made from flat sheet metal material. This is technologically demanding, complicated, and requires complex tools.

The pull-through technique is a material-efficient and space-saving technology.

DE 20 2012 103 987 A1 shows a busbar, which is formed from a double sheet-metal layer. Openings in the two layers, which are in alignment with each other, form a kind of passage for the electrical conductor. A loop may be bent out of one layer and guided through the passage to form a contact element.

DE 20 2019 104 688 U1, which corresponds to US 2021/0066824, which is incorporated herein by reference, discloses a flat, level busbar with a through-opening, which is surrounded by a perforated collar. The perforated collar is formed as a component separate from the busbar and is arranged over a wide area under the busbar. Through-holes in the perforated collar are in alignment with through-openings in the busbar to form an opening for receiving a clamping spring and for inserting an electrical conductor to be clamped to the busbar with the aid of the clamping spring.

DE 10 2010 015 457 shows a spring-force clamping connection with a busbar, which has a conductor insertion opening. A clamping spring, which is supported on the busbar by a contact leg, is inserted into the conductor insertion opening of the busbar. To guide and support an actuating element, an additional guide element is provided, which is arranged adjacent to the busbar, bordering the clamping spring, and projects away from the busbar and the plane defined by the conductor insertion opening. This guide element is placed from above onto the upper side of the busbar oriented in the direction of the conductor insertion opening of the insulating housing. On the opposite side, a material passage may be formed as a single piece in the busbar for the purpose of clamping an electrical conductor on a clamping edge of the material passage with the aid of the clamping spring.

SUMMARY OF THE INVENTION

It is therefore an object of the present invention to provide an improved spring-force clamping connection, an improved conductor terminal, and a method for manufacturing a spring-force clamping connection.

In an example of the invention, a separate sleeve may be inserted into the through-opening of a busbar. The sleeve may have a sleeve wall, which extends from an inlet to an outlet of the sleeve in a sleeve longitudinal direction. The separate sleeve is then inserted into the through-opening in the longitudinal direction of the sleeve, transversely to the busbar plane. The sleeve wall may have an outer circumferential contour, which, in the state of the sleeve inserted into the through-opening, abuts an inner circumferential contour of the through-opening.

The separate sleeve inserted into the through-opening is connected to the busbar.

The busbar and the sleeve may thus be initially manufactured independently of each other as separate components. This simplifies the manufacturing process and permits more complex geometries. Different materials and/or material coatings may also be used for the busbar and the sleeve.

The clamping of an electrical conductor takes place with the aid of a clamping point, which is formed by a clamping section of the clamping spring and a clamping section of the sleeve, for the purpose of electrically conductively connecting the electrical conductor to the busbar and securing it mechanically on the busbar.

To clamp multiple electrical conductors, which may if necessary also be designed as bridging elements or the like, it is conceivable that the busbar has multiple through-openings with assigned clamping springs. These may each be provided with an inserted sleeve, so that a sleeve is inserted at least into one of the through-openings.

The sleeve may be joined to the busbar. The possible joining methods are defined in the DIN standard 8593.

The sleeve may thus be connected to the busbar in a force-fitting manner. The sleeve may be pressed together with the busbar for this purpose.

The sleeve may be integrally connected to the busbar, for example by welding, soldering, or gluing.

The sleeve may be connected to the busbar in a form-fitting manner, for example, by a collar on the sleeve which abuts the busbar, and/or by latching projections which engage with the busbar, or by a receiving contour of the busbar in a fitted circumferential contour of the sleeve.

These joining methods may be used individually or advantageously also in combination with each other for the purpose of connecting the sleeve to the busbar in the region of the through-opening, into which the sleeve is inserted.

It is advantageous, for example, if the sleeve rests upon the busbar in a form-fitting manner with the aid of a collar and is pressed by its sleeve wall to the inner edge of the busbar bordering the through-opening. Form- and force-fitting connections are thus combined with each other.

Correspondingly, the combination of form and integral fits, force and integral fits, and form, integral and force fits are also conceivable to ensure a reliable connection between the sleeve and the busbar with a compact design and easy manufacturing. Not only the mechanical connection of the sleeve to the busbar should be ensured but also an electrical connection which ensures the least possible transfer resistance between the clamping section on the sleeve and the busbar.

By means of a pressing of the sleeve together with the busbar, a good current transfer is achievable with the least possible transfer resistance, which permits an optimal current density distribution from the clamping point to the busbar.

The sleeve may extend along the inner circumference of the through-opening over a range of at least 180°. This ensures that the sleeve is received in the through-opening in a form-fitting manner without a degree of freedom of movement in the busbar plane. Due to the accommodation in the through-opening over at least 180° in the through-opening, it may be fastened to a significant portion of the inner edge bordering the through-opening.

The sleeve may thus form a U-shaped frame in cross section, which has two opposite narrow side walls and a longitudinal side wall connecting the narrow side walls. The longitudinal side wall may be longer than one of the narrow side walls.

In the case of a rectangular through-opening, the U-shaped frame of the sleeve may thus abut three sides of the through-opening, i.e., the two narrow sides and one longitudinal side of the through-opening, and be connected to the busbar in this region of the longitudinal side and the two narrow sides. If the narrow side walls of the U-shaped frame then abut, with their free front edge, the longitudinal side of the through-opening opposite the longitudinal side wall of the U-shaped frame, the U-shaped frame is held in the rectangular through-opening in a form-fitting manner.

The rectangular through-opening does not have to any corners running at a sharp right angle. Instead, the rectangular through-opening may also have rounded edges or be designed as an oval or circular through-opening.

The sleeve may form a rectangular frame in cross section, which has two opposite narrow side walls and two opposite longitudinal side walls. The two opposite longitudinal side walls connect the narrow side walls to each other. The diametrically opposed ends of a narrow side wall may each be connected to an end region of the diametrically opposed longitudinal side walls to form in this way a rectangular frame in cross section, which corresponds to the cutout or the contour of the through-opening. This rectangular sleeve in cross section may then be fitted into the corresponding rectangular through-opening.

The connection of the sleeve to the busbar may therefore take place via a press fit.

One of the narrow side walls may have an inclination oriented from the inlet at the busbar plane to the outlet in the direction of the opposite narrow side wall. This inclined narrow side wall may then provide a clamping section for clamping an electrical conductor. For example, the free lower front edge of the inclined narrow side wall may form a clamping edge for clamping the electrical conductor. The electrical conductor is then clamped firmly in place with the clamping section of the clamping spring, which my also be formed, for example, as a clamping edge on the free end of the clamping leg. With the aid of clamping edges of this type, which are formed by the free end faces of the sleeve and the clamping spring, a withdrawal of the electrical conductor is made more difficult without opening the clamping spring.

The sleeve may extend along the circumference of the through-opening over a range of at least 360°. The sleeve thus abuts the through-opening over the entire circumference of the circumferential contour thereof and is no longer movable in any degree of freedom in a direction toward the busbar.

The outer circumferential contour of the sleeve may correspond to the through-opening over the entire circumference of the inner circumferential contour, the sleeve abutting the busbar over the entire circumference. The sleeve is thus connected at least in a form-fitting manner to the edge region bordering the through-opening over the greatest possible surface area. In addition, the contact surface for securing an electrically conductive connection of the sleeve to the busbar is greatly improved thereby.

The busbar may have a greater wall thickness than the wall thickness of the sleeve wall. From a manufacturing perspective, the busbar as well as the sleeve are therefore correspondingly designed and optimized with regard to the particular stability requirements and their function.

The sleeve wall may have a separating slit extending in the longitudinal direction of the sleeve in a section which is not designed for clamping the electrical conductor to the sleeve wall with the aid of the clamping spring. This separating slit may extend, for example, continuously from the inlet to the outlet of the sleeve. The sleeve may thus be widened when inserted into the through-opening, to thereby be connected to the busbar, possibly using additional joining methods. Alternatively, the sleeve may also be manufactured so as to be widened with respect to the through-opening in the busbar, so that the sleeve compresses when inserted into the through-opening. The sleeve may be held in the through-opening, for example, by means of an elastic spring force.

The separating slit may be situated opposite the section of the sleeve wall designed for clamping the electrical conductor.

A fixing opening may be arranged adjacent to the through-opening, which is connected to the through-opening by a channel. The sleeve may have a fixing projection with a fixing contour corresponding to the circumferential contour of the fixing opening. The fixing projection may be connected to the sleeve wall by a crosspiece insertable into the channel. The fixing opening has a greater width than the channel connecting the fixing opening to the through-opening, advantageously transversely to the extension direction of the busbar.

Adjacent to the through-opening, a further puzzle-like form fit is thus created in the busbar with the aid of the fixing opening, into which a fixing projection of the sleeve is inserted. This increases the connecting surface area between the sleeve and the busbar.

Two diametrically opposed fixing openings at diametrically opposed peripheral edges of the through-opening may be arranged on a common through-opening. The sleeve then has two diametrically opposed crosspieces with fixing projections formed thereon, which extend in opposite directions from each other.

The sleeve is held in a particular fixing opening by its fixing projections in a form-fitting manner on both sides, i.e., on the narrow sides, of the through-opening, and may also be additionally fastened with the aid of joining methods, for example pressing, soldering, welding, gluing and the like.

The busbar may have multiple parts. A fixing opening having a narrower channel leading from the free end to the fixing opening may be present on one end of a particular part of a busbar. A sleeve with two crosspieces situated opposite each other and extending in opposite directions from each other with fixing projections formed thereon may then be inserted with their fixing projections into the particular fixing opening of a part of a busbar and connected there to the particular part of the busbar. A busbar integrally joined to the sleeve is thus formed on the fixing projections of the sleeve, which may be made up of multiple separate parts and is joined to a sleeve connecting these parts.

This permits the manufacturing of standardized components, which may be joined together as needed into a desired shape.

The sleeve may be formed from a different material than the busbar. For example, the busbar may be manufactured from a copper alloy and be uncoated, partially coated, or fully coated. The busbar may be, for example, fused tin-plated. The sleeve may then be manufactured, for example, from an aluminum alloy. The busbar may be manufactured, for example, from an aluminum material, which is more economical compared to a copper material. The sleeve may also be coated with more costly coating materials, for example with a silver or gold coating. By using a separate sleeve, a much smaller coating surface is necessary than in the case of a sleeve integrally manufactured together with the busbar.

Due to different types of sleeves, which are adapted to the type of the conductor to be connected in each case, for example copper and aluminum conductors, the spring-force clamping connection having a standard busbar may be adapted as needed by the manufacturer for the particular type of use by inserting a suitable sleeve in each case. Different types of use may be combined with a common busbar.

With the aid of separate sleeves manufactured as standardized single parts, a modular system is thus provided, which permits an efficient manufacturing of different types of spring-force clamping connections.

The outer surface and/or the inner surface of the busbar, which borders the through-opening, may have an embossed surface structure. A press fit between the sleeve and the busbar may be improved with the aid of embossings of this type, for example a ribbed embossing.

The manufacturing of a spring-force clamping connection described above may take place very efficiently by stamping or cutting out a through-opening in the busbar, forming a semi-finished sheet metal product for creating a sleeve, including a sleeve wall which extends from an inlet to an outlet of the sleeve in a sleeve longitudinal direction, inserting the sleeve into the through-opening of the busbar in such a way that the sleeve longitudinal direction is oriented transversely to the busbar, and joining the sleeve to the busbar. The joining may take place, for example, by pressing, welding, soldering, latching, or caulking the sleeve to the busbar or also by a combination of different joining methods of this type.

The pressing of the sleeve into the busbar may take place after a manufacturing of the busbar carried out in a stamping/bending process, outside of the stamping/bending tool used to manufacture the busbar. The sleeve may be connected to the busbar, for example, prior to mounting the busbar in an insulating housing.

The sleeves may be manufactured from a sheet metal strip using the forming process, for example by stamping/bending, and then be processed cohesively into a semi-finished strip material product. This strip-shaped semi-finished product may then be supplied to a joining machine. The semi-finished product of the strip-shaped sleeves may also be supplied as such continuously to a strip electroplating system, where it is coated.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
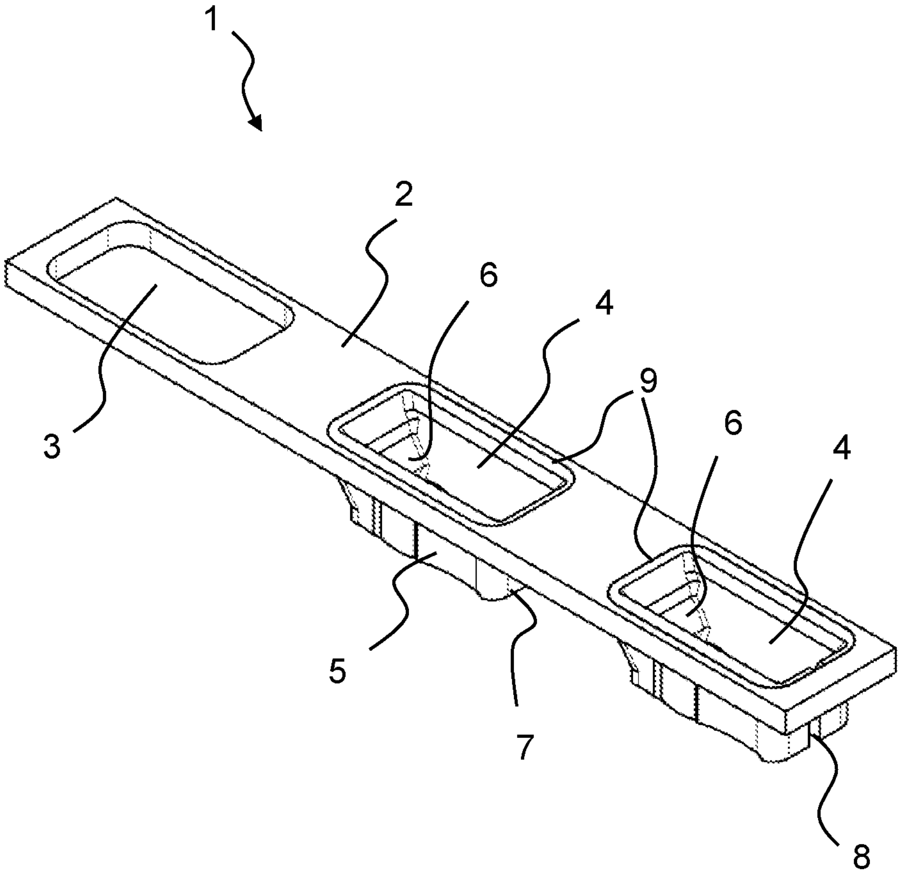
FIG. 1 shows a perspective view of a busbar having through-openings and two different separate sleeves.

FIG. 1 shows a perspective view of a spring-force clamping connection 1, including a busbar 2, into which through-openings 3 are introduced. As illustrated, through-openings 3 may be, for example, rectangular, the corners being able to be sharp-edged or, as illustrated, rounded.

Sleeves 4 are inserted into though-openings 3 for the purpose of creating a passage for clamping an electrical conductor, which is inserted downwardly from the illustrated upper side, through the interior of sleeve 4, and clamped to sleeve 4 with the aid of a clamping spring.

In the illustrated exemplary embodiment, sleeves 4 extend 360° around the circumference of through-opening 3 and have two diametrically opposed longitudinal side walls 5 and two diametrically opposed narrow side walls 6, 7 transverse thereto. Narrow side wall 6 on the left in the figure is inclined in the direction of opposite narrow side wall 7 to create in this way a presented clamping point for clamping an electrical conductor.

It is furthermore apparent that sleeves 4 each have an outwardly protruding collar 9 in their edge region, which extend along the circumference of sleeve 4 and protrude over the edge region of through-opening 3 in the inserted state in busbar 2. In this way, sleeve 4 is inserted into busbar 2 in a form-fitting manner and is held on the upper busbar plane of busbar 2 with the aid of collar 9.

In this context, it is conceivable that busbar 2 has an indentation or seam in the upper edge region of through-opening 3 for the purpose of accommodating collar 9 and to finally connect sleeve 4 to busbar 2 in a form-fitting manner and yet flush with the upper busbar plane of busbar 2.

Figure 2:
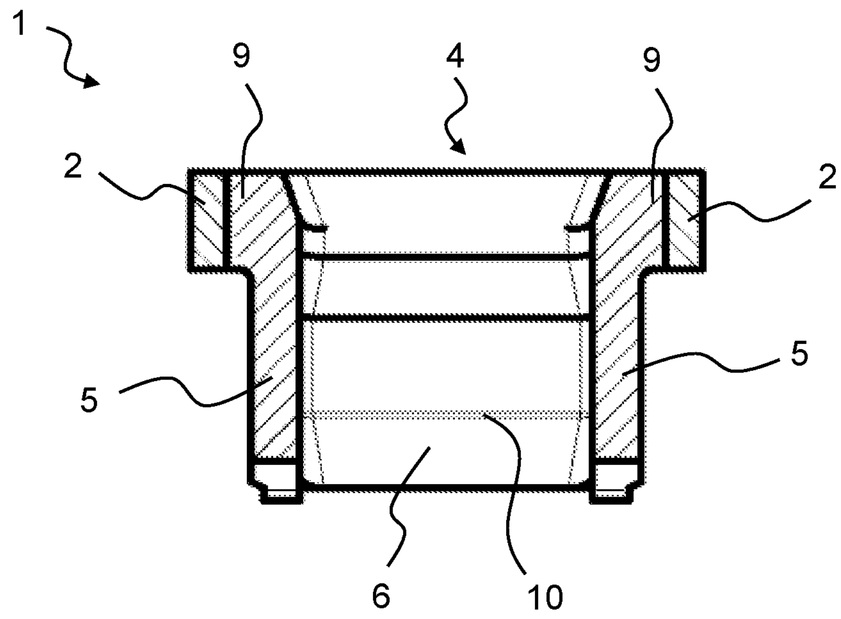
FIG. 2 shows a sectional view of the spring-force clamping connection from FIG. 1.

FIG. 2 shows a cross-sectional view of a specific embodiment, in which sleeve 4 is received in through-opening 3 of busbar 2, the upper side of sleeve 4 terminating flush with the upper busbar plane. Collar 9 abuts the inner edge of the inner wall of busbar 2 bordering the through-opening.

In the example, sleeve 4 is received in through-opening 3 in a form-fitting manner and connected to busbar 2 in a force-fitting manner by pressing.

However, it is also conceivable that sleeve 4 is integrally connected to busbar 2, for example by welding, soldering, or gluing. This may be combined with a press fit of sleeve 4 in busbar 2.

It is apparent that a protruding clamping edge 10, to which an electrical conductor may be clamped, is created by inclined narrow side wall 6. The contact surface of the electrical conductor on sleeve 4 is concentrated onto this clamping edge 10, so that the surface pressure applied by a clamping spring 15 to the electrical conductor is increased in comparison to a contact over a wide area.

Figure 3:
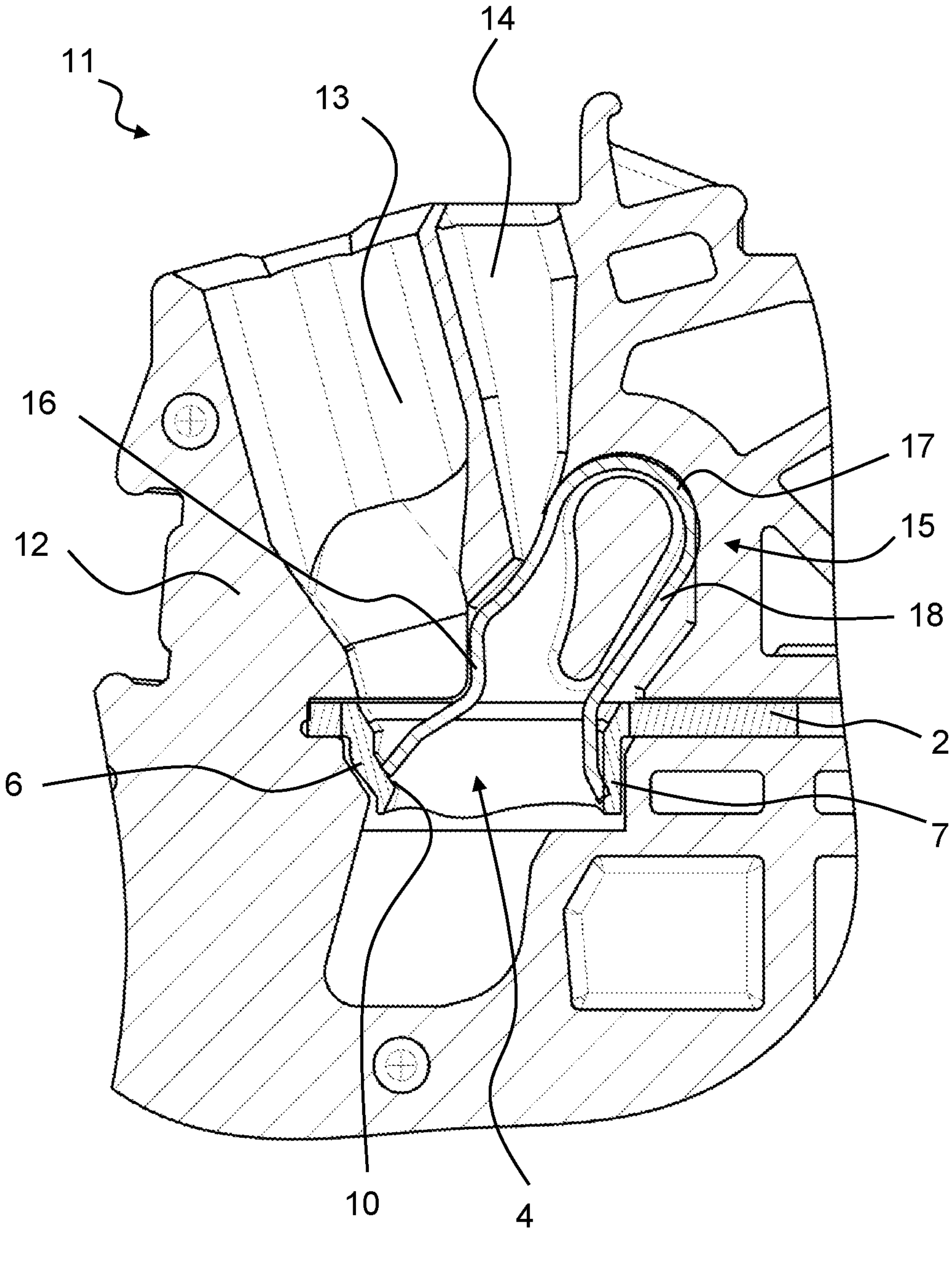
FIG. 3 shows a side sectional view of a conductor terminal, including an insulating housing and spring-force clamping connection.

FIG. 3 shows a side sectional view of a conductor terminal 11, into which a spring-force clamping connection 1, including a busbar 2 with at least one sleeve 4 inserted therein, is installed in an insulating housing 12. It is apparent that insulating housing 12 has a conductor insertion opening 13 leading to the upper inlet of sleeve 4.

An actuating opening 14 is furthermore present for receiving a separate actuating tool or an actuating element built into insulating housing 12 (e.g., actuating pushbutton or actuating lever), which leads to a clamping spring 15. In the illustrated exemplary embodiment, clamping spring 15 is designed as a U-shaped leaf spring having a clamping leg 16, an adjoining spring bend 17, and an adjoining contact leg 18. Contact leg 18 projects into the interior of sleeve 4 and abuts narrow side wall 7, which is situated opposite inclined narrow side wall 6 having clamping edge 10.

Clamping leg 16 also projects into the interior of sleeve 4 and is positioned with its free end forming a clamping edge 10 on narrow side wall 6 adjacent to clamping edge 10.

If an electrical conductor is now guided into the interior of sleeve 4 through conductor insertion opening 13 of insulating housing 12, and clamping leg 16 is displaced against the spring force in the direction of contact leg 18 by an actuating tool inserted into actuating opening 14, the electrical conductor becomes situated between narrow side wall 6 with clamping edge 10 and the free end of clamping leg 16. The free end of clamping leg 16, together with clamping edge 10 of narrow side wall 6, forms a clamping point for the electrical conductor, which is pressed by the spring force against narrow side wall 6 and, in particular, clamping edge 10.

An electrically conductive contact of the electrical conductor with sleeve 4 and busbar 2 connected to the electrical conductor is established thereby. The electrical conductor is also firmly held mechanically on sleeve 4 and busbar 2 connected thereto by spring force.

Figure 4:
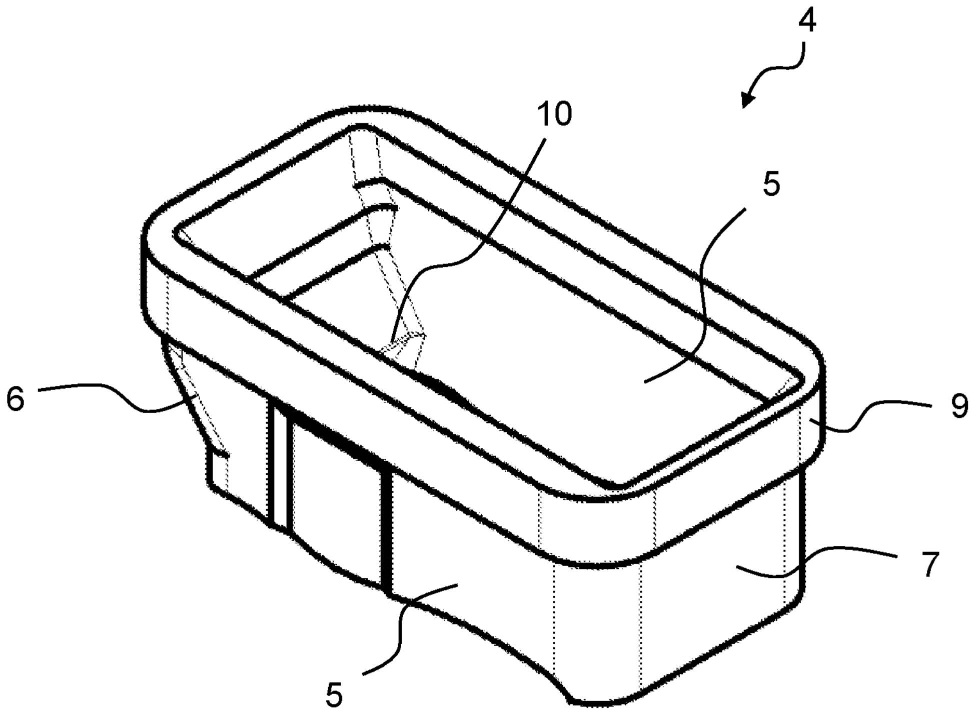
FIG. 4 shows a perspective view of the sleeve.

FIG. 4 shows an example of a first specific embodiment of a sleeve 4, including a collar 9 surrounding the circumference by 360°, from which two diametrically opposed longitudinal side walls 5 and the two diametrically opposed end face walls 6, 7 extend. It is apparent that the end regions of longitudinal side walls 5 spaced a distance apart are each connected to an end face wall 6, 7, which are also spaced a distance a part, so that a rectangular sleeve 4 in cross section having a free interior is formed.

It is also clear that narrow side wall 6 is positioned at an angle over a section, i.e., inclined in the direction of opposite narrow side wall 7, to create a presented clamping edge 10.

In another variant, this clamping edge 10 may, however, also be present at the lower free end of narrow side wall 6. In this case, narrow side wall 6 is positioned, not as illustrated, in the lower inner region of the outlet, again in parallel to particular narrow side wall 7 or inclined away therefrom.

Figure 5:
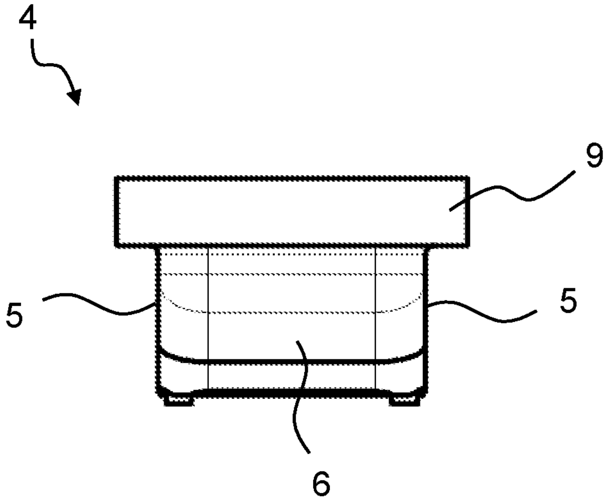
FIG. 5 shows a front view of a specific embodiment of a sleeve.

FIG. 5 shows a side view of sleeve 4 from FIG. 4. It is clear that collar 9 projects to the side from the outside of longitudinal side wall 5 and correspondingly also from narrow side walls 6, 7.

When sleeve 4 is inserted into through-opening 3 in busbar 2, the outer edges of collar 9 abut the inner circumferential contour bordering opening 3, i.e., the end-face inner edge, where it may be connected to busbar 2.

The dimensions of sleeve 4 in the region adjoining collar 9 (i.e., the outer length and outer width of the sleeve walls below the collar) are then smaller than the corresponding dimensions of opening 3. Clearance may be present or preferably a press fit.

Figure 6:
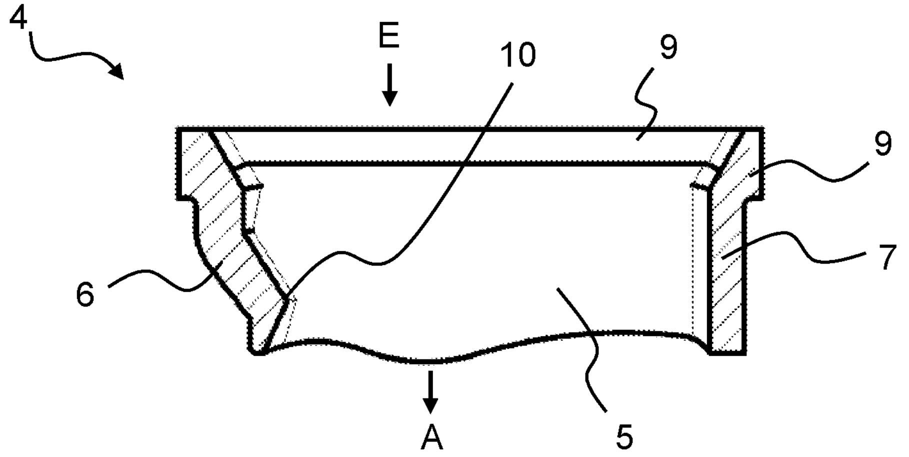
FIG. 6 shows a side sectional view of a first specific embodiment of the sleeve.

FIG. 6 shows a longitudinal sectional view of sleeve 4 from FIG. 4. It is apparent that one of narrow side walls 6 is positioned at an angle in the direction of opposite narrow side wall 7 to form a presented clamping edge 10. The section of inclined narrow side wall 6 continuing downwardly in the direction of outlet A is then inclined away from opposite narrow side wall 7. A protruding clamping edge 10 is created thereby.

If an electrical conductor is now inserted from inlet E to outlet A, it may abut this clamping edge 10 and be clamped there.

It is also clear that collar 9 projects over the contour of abutting narrow side walls 6, 7 in the region of inlet E of sleeve 4. This edge region 9 in the illustrated exemplary embodiment has a greater material thickness than adjoining narrow side walls 6, 7 and longitudinal side walls 5. This is advantageous for a force-fitting connection, for example, by pressing together with busbar 2.

It is further apparent that the inner surfaces of collar 9 run outwardly at an angle in the direction of inlet E to form in this way an insertion funnel for inserting an electrical conductor on the left side and a receiving space for contact leg 18 of clamping spring 15.

Figure 7:
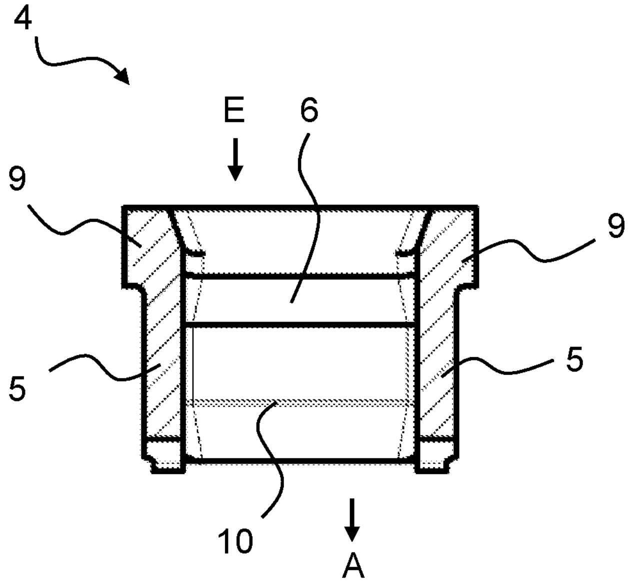
FIG. 7 shows a cross-sectional view of the sleeve from FIGS. 4 and 5.

FIG. 7 shows a cross-sectional view of sleeve 4 from FIG. 4, from which the protrusion of collar 9 over the outside of longitudinal side walls 5 emerges, as does the angled position of the inside of collar 9 provided toward the outside in the direction of the inlet.

Diametrically opposed longitudinal side walls 5 and diametrically opposed narrow side walls 6, 7 extend from collar 9 at inlet E in the sleeve longitudinal direction to outlet A. In the illustration in FIG. 7, the sleeve longitudinal direction is oriented from top to bottom.

Figure 8:
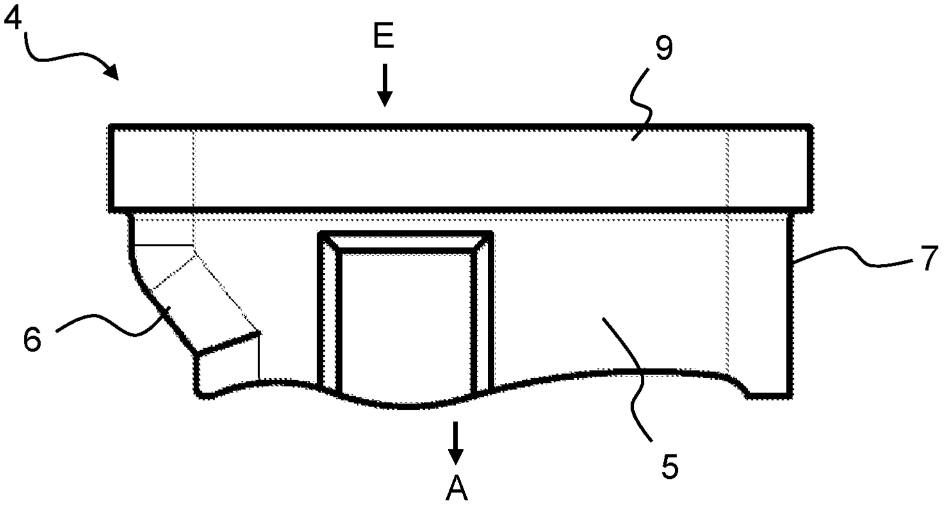
FIG. 8 shows a side view of the sleeve from FIGS. 4 through 6.

FIG. 8 shows a side view of sleeve 4 from FIG. 4. It is apparent that sleeve walls 5, 6, 7 extend downward from collar 9 in the region of inlet E to outlet E in the sleeve longitudinal direction.

Figure 9:
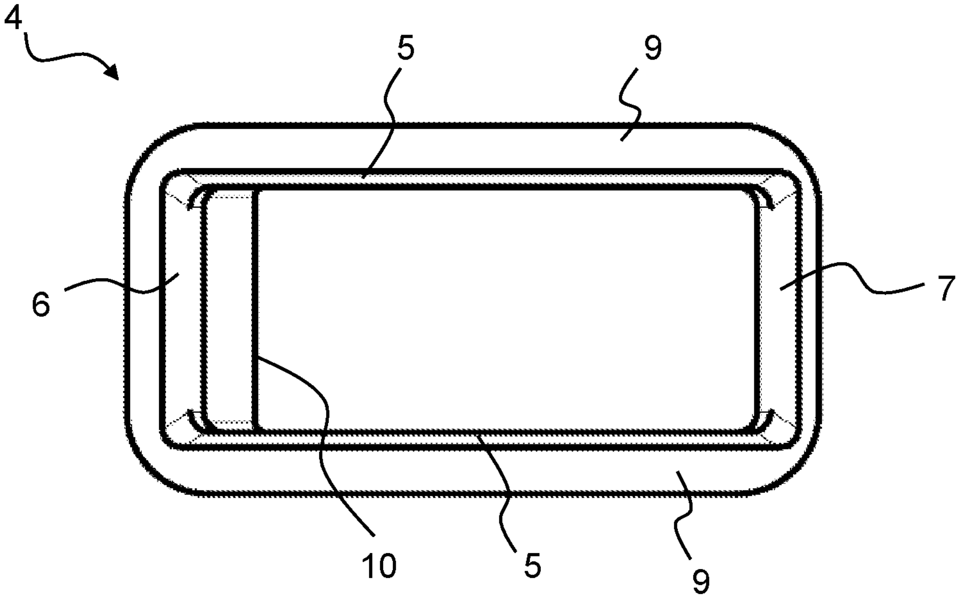
FIG. 9 shows a top view the sleeve from FIG. 7.

FIG. 9 shows a top view of sleeve 4 from FIG. 4. If is clear that collar 9 has a greater material width than, for example, narrow side wall 7 on the right side, but also greater than inclined narrow side wall 6, which is provided with protruding clamping edge 10 for clamping an electrical conductor.

It is furthermore apparent that sleeve 4 is rectangular. In the illustrated exemplary embodiment, the corners are rounded, but they may also be less rounded to sharp-edged (90° corners).

Figure 10:
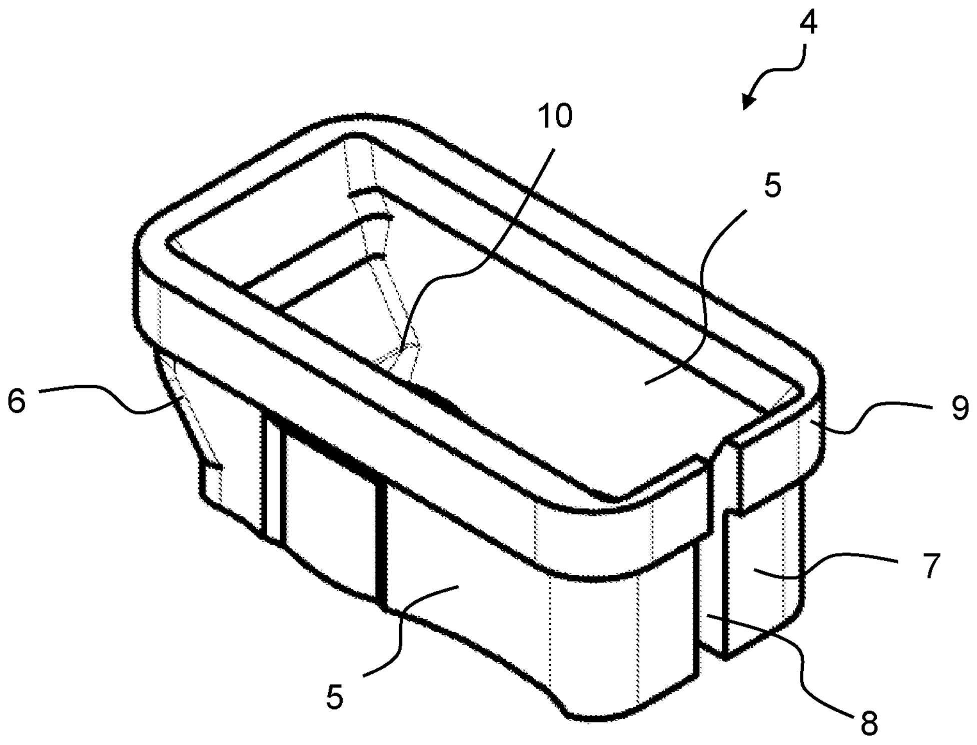
FIG. 10 shows a perspective view of a second shape of a sleeve.

FIG. 10 shows a modified specific embodiment of a sleeve 4. It is essentially comparable to the specific embodiment illustrated in FIG. 4. However, a separating slit 8 is additionally provided in narrow side wall 7, which is opposite presented clamping edge 10 of opposite narrow side wall 6. This separating slit extends from inlet E to outlet A and is formed continuously through narrow side wall 7 in the sleeve longitudinal direction. In other variants, however, it is also conceivable that separating slit 8 is not continuous but extends only over a portion of the sleeve longitudinal direction from collar 9 to the opposite outlet.

It is nevertheless advantageous if separating slit 8 is situated at least in the region of collar 9. Sleeve 4 may then be more easily widened for a force-fitting connection by pressing in the region of collar 9. Or the sleeve is manufactured as widened and is compressed during mounting, whereby a clamping force is generated.

Figure 11:
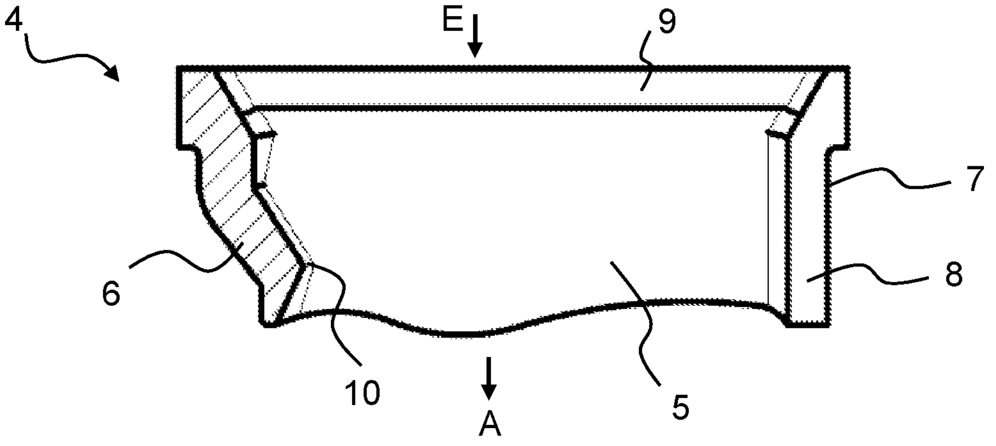
FIG. 11 shows side sectional view of the sleeve from FIG. 10.

FIG. 11 shows a longitudinal sectional view of sleeve 4 from FIG. 10. It is apparent that, on the left in the sectional view, inclined narrow side wall 6 with clamping edge 10 is continuous, while opposite narrow side wall 7 on the right is separated by separating slit 8. The view of the end face of slitted narrow side wall 7 on the right bordering separating slit 8 is apparent in the sectional representation in FIG. 11.

Figure 12:
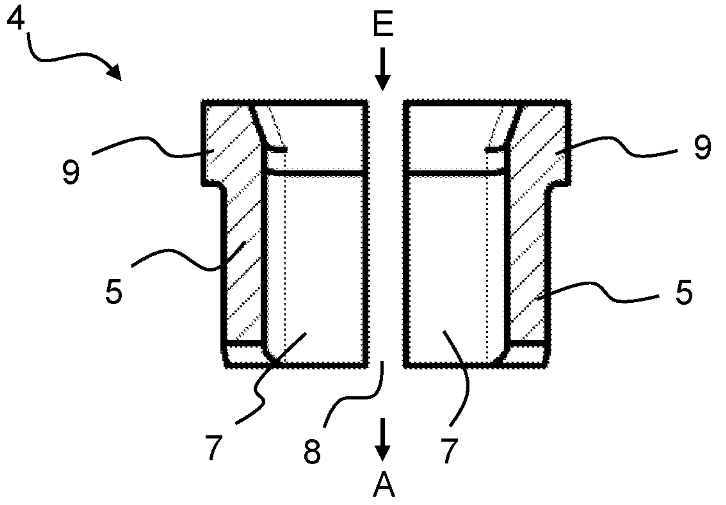
FIG. 12 shows a cross-sectional view of the sleeve from FIG. 10.

FIG. 12 shows a cross-sectional view of sleeve 4 from FIGS. 10 and 11 with a view toward narrow side wall 7 with separating slit 8. It is clear that separating slit 8 runs continuously from inlet E of sleeve 4 to outlet A over the entire sleeve longitudinal direction and thereby separates narrow side wall 7 into two parts.

Moreover, sleeve 4 may be designed as described for the first exemplary embodiment. However, it may also be modified in structural details. Separating slit 8 is preferably arranged in narrow side wall 7 centrally between longitudinal side walls 5 but may also be provided eccentrically.

Figure 13:
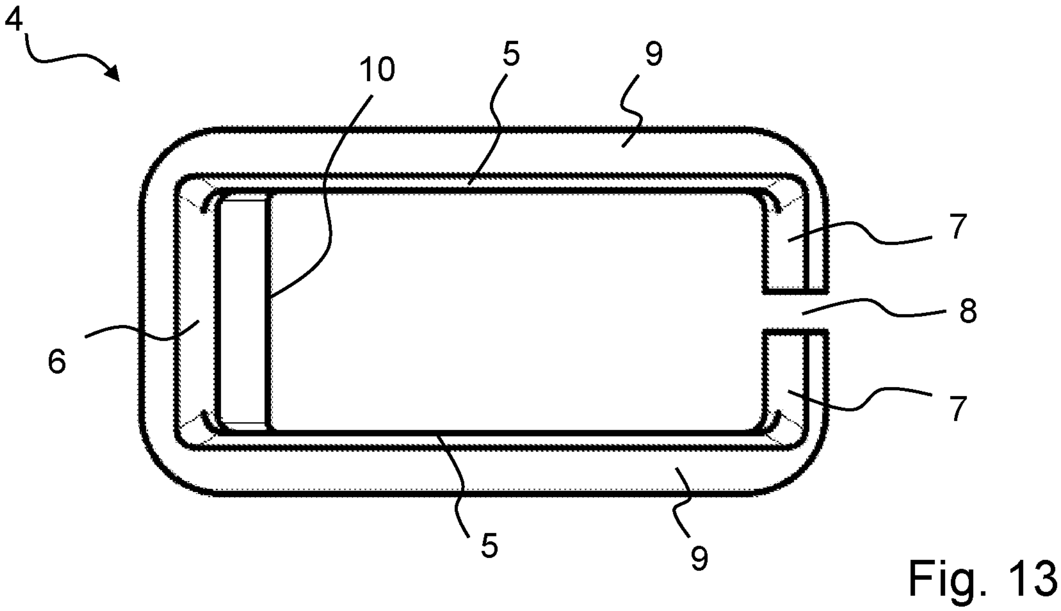
FIG. 13 shows a top view the sleeve from FIG. 10.

FIG. 13 shows a top view of sleeve 4 from FIGS. 10 through 12. It is clear that separating slit 8 divides right narrow side wall 7 into two parts. Opposite narrow side wall 6 on the left, however, which is provided for clamping an electrical conductor, is continuous, whereby sleeve 4 is still in one piece.

In a conceivable, modified embodiment, separating slit 8 may also extend over a larger region of narrow side wall 7, up to an embodiment, in which the separating slit extends over entire narrow side wall 7, so that this narrow side wall is completely eliminated. In an embodiment of this type, only longitudinal side walls 5 and narrow side wall 6, on which clamping edge 10 is formed, are present.

Figure 14:
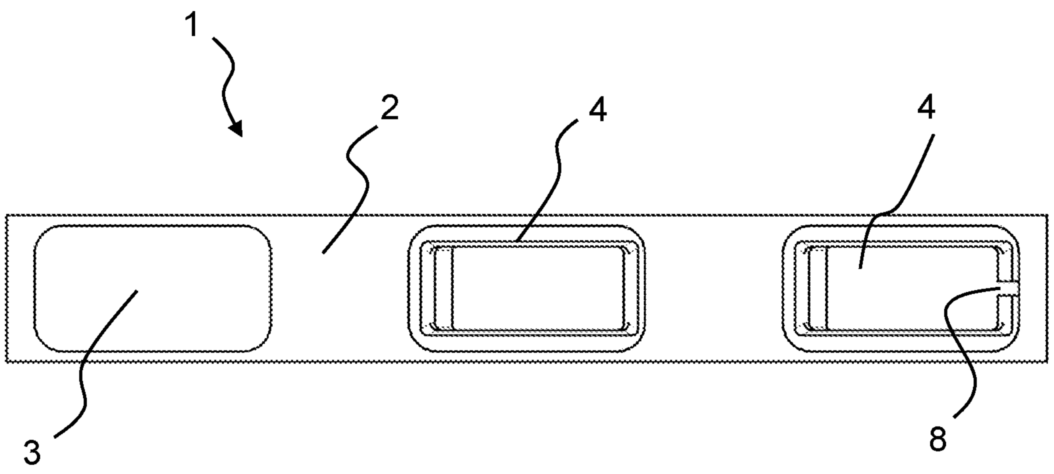
FIG. 14 shows a top view of the busbar, including the sleeve from FIG. 1.

FIG. 14 shows a top view of spring-force clamping connection 1 from FIG. 1, including busbar 2 and three through-openings 3 arranged next to each other in the longitudinal direction of busbar 2. The specific embodiment of sleeve 4 from FIG. 4 is inserted into the middle through-opening, and the second specific embodiment of sleeve 4 from FIG. 10 is inserted into right through-opening 3. In the case of right sleeve 4, separating slit 8 is clearly apparent.

Figure 15:
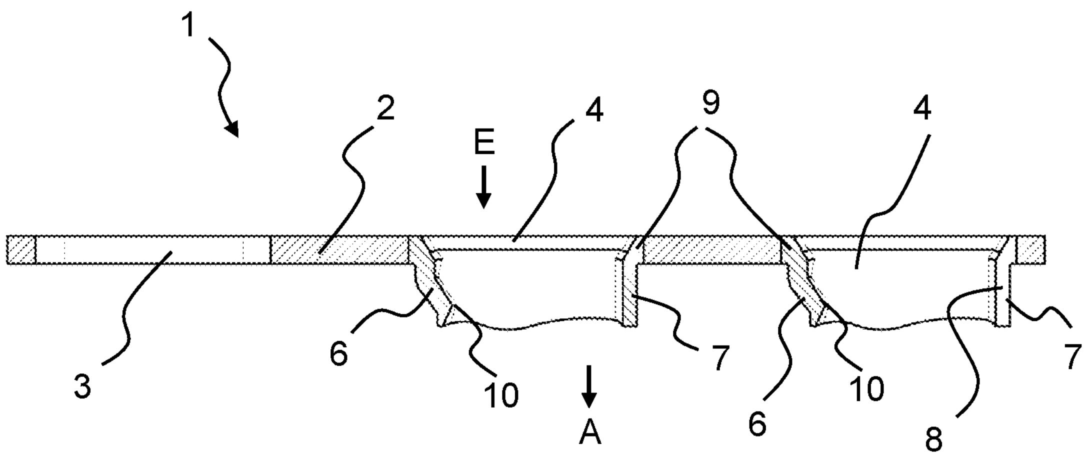
FIG. 15 shows side sectional view of the busbar from FIGS. 1 and 14.

FIG. 15 shows a side sectional view of spring-force clamping connection 1 from FIG. 14. It is clear that the sleeve is inserted with its collar 9 into through-opening 3, flush in each case by a press fit, and is connected in this way to busbar 2 in a force-fitting manner.

It is also apparent that, with its edge region or collar 9, sleeve 4 extends from the upper busbar plane in the region of inlet E in the sleeve longitudinal direction, transverse to the busbar plane, through opening 3 and further downward. The sleeve direction defined by inlet and output E, A is thus oriented perpendicularly to the busbar plane of busbar 2.

Transverse and perpendicular are understood to be an angle which may essentially be 90° with a tolerance of possibly, for example, ±10°. The perpendicular insertion of sleeve 4 into busbar 2 in relation to the busbar plane (transverse) does not require an exact perpendicular orientation at an angle of 90° to the busbar plane.

Figure 16:
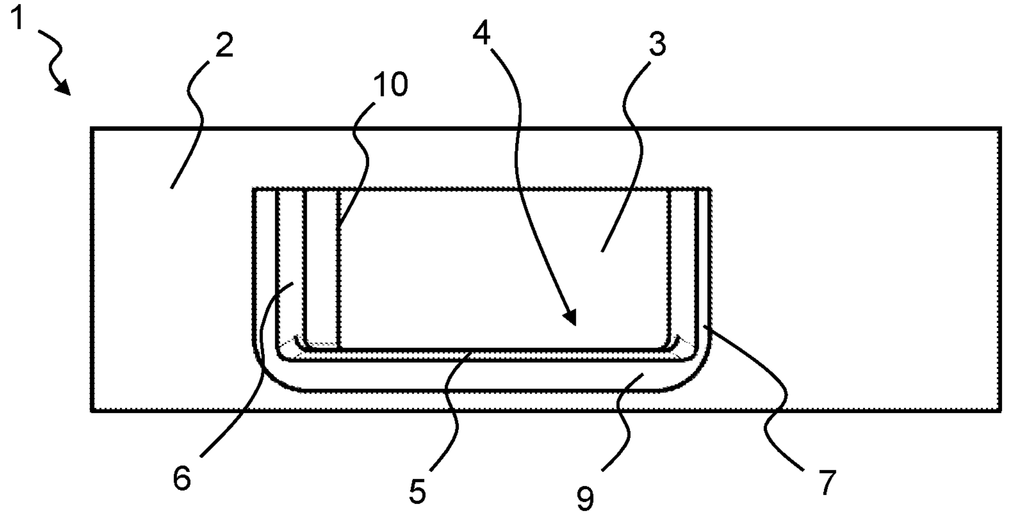
FIG. 16 shows a top view of a busbar, including a U-shaped sleeve.

A spring-force clamping connection 1, including a busbar 2 and another exemplary embodiment of sleeve 4, is apparently in FIG. 16. The latter is provided with a U-shaped design in cross section or in the top view and has a longitudinal side wall 5 and two diametrically opposed narrow side walls 6, 7. One of narrow side walls 6 is again (optionally) inclined against the opposite arrow side wall 7 to form a clamping edge 10.

This sleeve 4 now extends with two 90° bends of sleeve walls 5, 6, 7 at an angle of 180° over the circumference of through-opening 3 of busbar 2.

The lengths of narrow side walls 6, 7 are dimensioned in such a way that sleeve 4 abuts a longitudinal inner edge of busbar 2 bordering opening 3, and narrow side walls 6, 7 then extend as far as the opposite longitudinal inner edge in such a way that they abut it. Sleeve 4 is again connected in a form-fitting manner to the inner edges of busbar 2, which border opening 3, preferably by a press fit, in that they at least partially abut it by the press fit.

However, the connection may also take place using an integral fit, for example by welding. An integral fit of this type may also additionally support the illustrated force fit using the press fit. Sleeve 4 may also be arranged in through-opening 3 with clearance and be connected to busbar 2 only by an integral fit.

Figure 17:
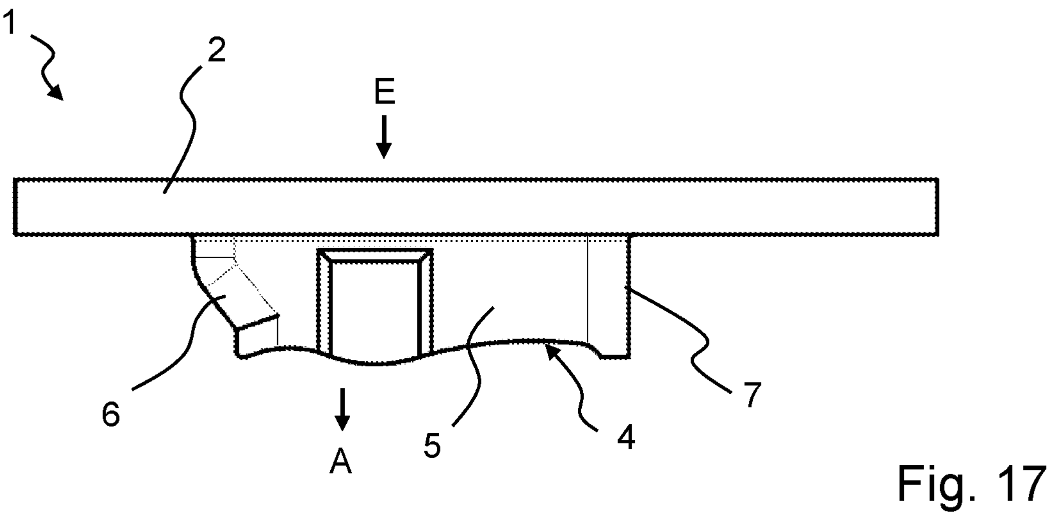
FIG. 17 shows a side view of the busbar, including the sleeve from FIG. 16.

FIG. 17 shows a side view of spring-force clamping connection 1 from FIG. 16. It is apparent that sleeve 4 extends from inlet E to outlet A in the sleeve longitudinal direction perpendicularly to the busbar plane of busbar 2, so that sleeve walls 5, 6, 7 protrude downwardly from busbar 2 to outlet A.

Figure 18:
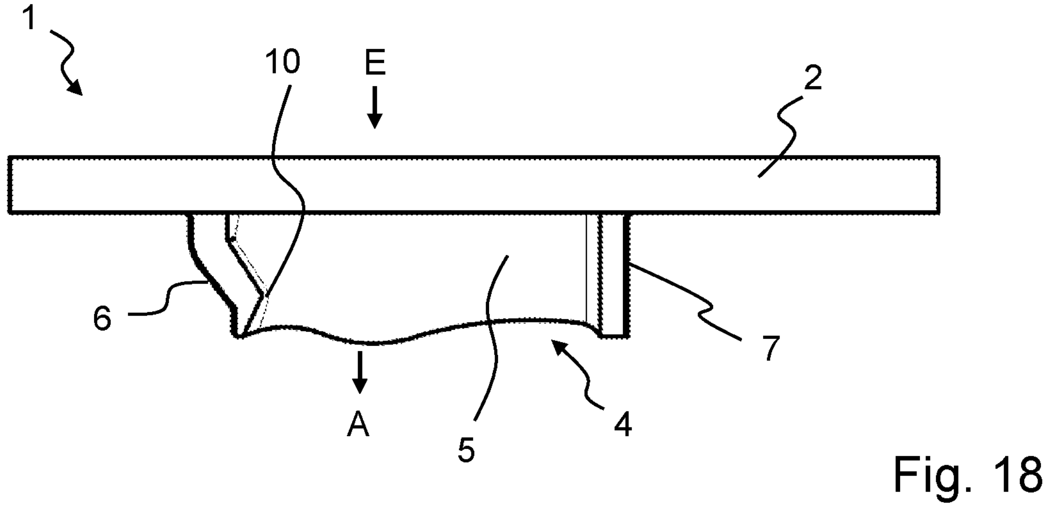
FIG. 18 shows a side view of the busbar, including the U-shaped sleeve from FIG. 16.

FIG. 18 shows a rotated side view with a view toward the interior of sleeve 4. It is clear that the front edge of diametrically opposed narrow side walls 6, 7 form a surface which abuts the inner edge of the longitudinal side of opening 3 bordering opening 3 in the unseen part.

Figure 19:
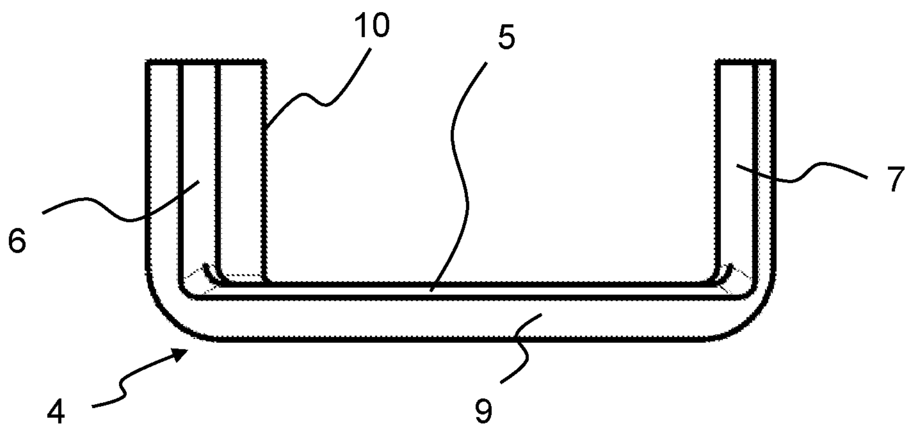
FIG. 19 shows a top view of the U-shaped sleeve.

FIG. 19 shows a top view of U-shaped sleeve 4. It is again apparent that sleeve 4 has a greater material with in the upper region at collar 9 than the material width of narrow side walls 6, 7 and longitudinal side wall 5.

Figure 20:
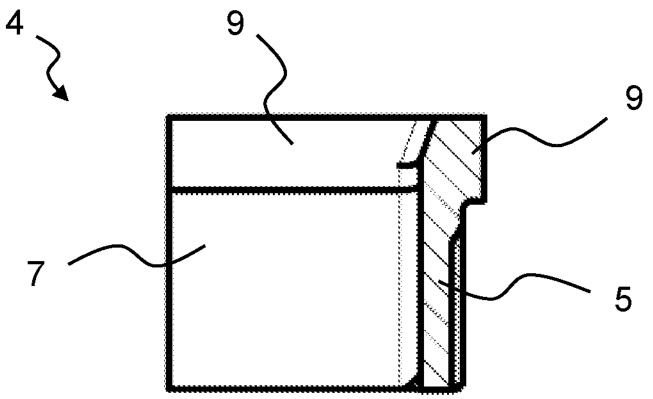
FIG. 20 shows a cross-sectional view of the sleeve from FIG. 19.

This is even more clearly apparent from the cross-sectional view in FIG. 20. It is also apparent that collar 9 projects toward the outside of the sleeve walls, for example longitudinal side wall 5. However, this is only optional.

In other specific embodiments, the outside of collar 9 may, however, also be alignment with the outside of sleeve walls 5, 6, 7.

Figure 21:
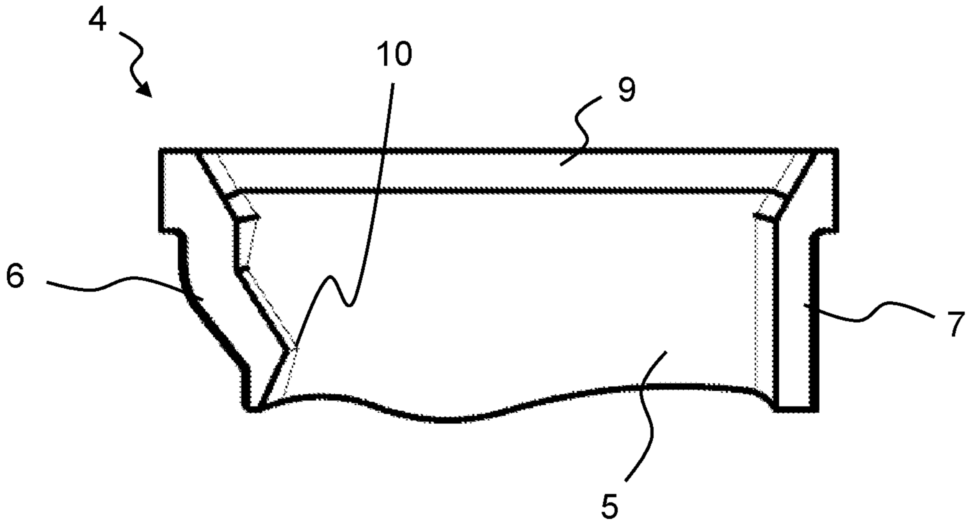
FIG. 21 shows a side view into the interior of the U-shaped sleeve.

FIG. 21 shows a rotated side view of sleeve 4 with a view toward the end faces of diametrically opposed narrow side walls 6, 7. It is clear that left narrow side wall 6 is designed to clamp an electrical conductor and is inclined in the direction of opposite end side wall 7 for this purpose.

Opposite end side wall 7, however, extends transversely to the plane of sleeve 4 spanned by collar 9 in the sleeve longitudinal direction.

Figure 22:
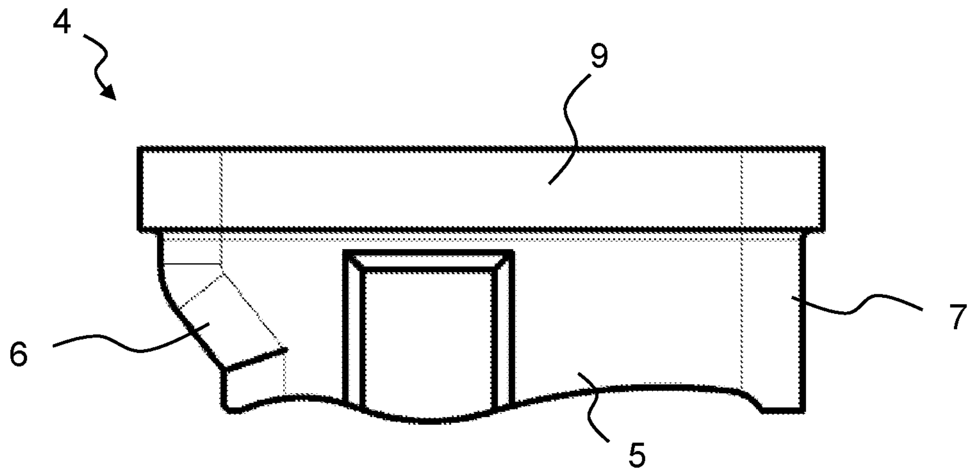
FIG. 22 shows a side view onto the outside longitudinal side wall of the U-shaped sleeve.

FIG. 22 shows a side view of sleeve 4 from FIG. 21 and with a view toward the only longitudinal side wall 5, which is connected to an end face wall 6, 7 in each case on its left and right ends. These end face walls 6, 7 protrude transversely from the plane of longitudinal side wall 5 in the viewing direction.

Figure 23:
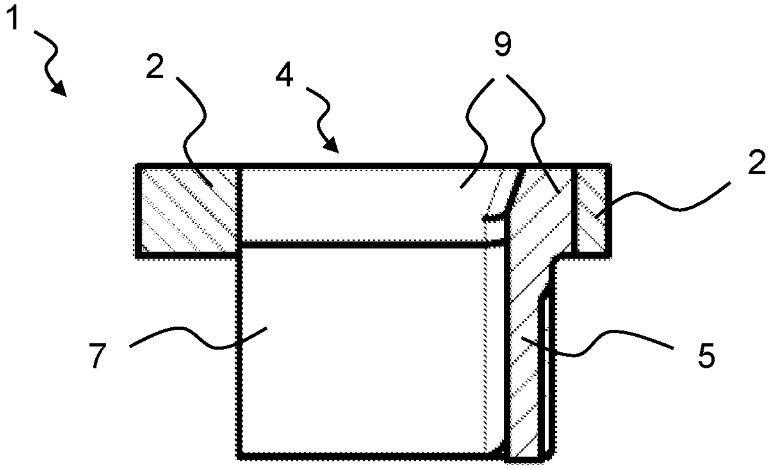
FIG. 23 shows a cross-sectional view of a variant of the U-shaped sleeve inserted into a busbar, including the collar.

FIG. 23 shows a cross-sectional view of a spring-force clamping connection 1, including a U-shaped sleeve 4 inserted in opening 3 of a busbar 2.

It is apparent that collar 9 abuts the inner edge of busbar 2 bordering opening 3 on the right side. On the side opposite longitudinal side wall 5, the end faces of narrow side walls 6, 7 abut the inner edge of busbar 2, which borders opening 3. Sleeve 4 is again received in busbar 2 in a form-fitting manner with the aid of a press fit. It is held in a form-fitting manner in the extension direction of the busbar plane, i.e., in the present case in the viewing direction and transversely to the left and the right.

A downward or upward slipping out of sleeve 4 may be prevented by a press fit, i.e., by pressing in and a friction fit.

It is conceivable that a further form fit is created due to a movement in the degree of freedom of the sleeve longitudinal direction, i.e., from the inlet to the outlet transversely to the busbar plane of busbar 2. This may be implemented by elevations on side walls 5, 6, and/or 7 which engage over and/or under busbar 2. An additional integral connection may also be provided by means of welding, soldering, gluing, and the like.

Figure 24:
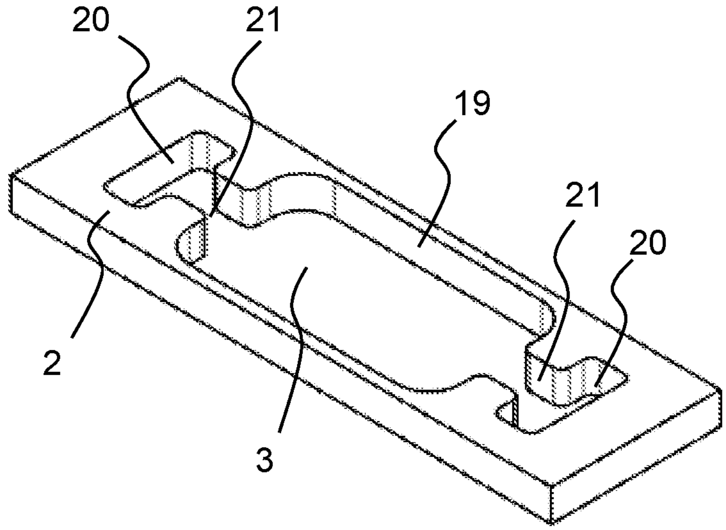
FIG. 24 shows a perspective view of a busbar having a through-opening and fixing opening adjacent thereto.

FIG. 24 shows a further exemplary embodiment of a busbar 2 with a through-opening 3, which is adjoined in each case by a fixing opening 20 in the longitudinal direction. In the illustrated example, fixing opening 20 is present on the diametrically opposed narrow sides of through-openings 3. It is a widened bay, which transitions into through-opening 3 through a narrower channel 21.

Sleeve 4 may be connected in this way to busbar 2 with an improved form fit.

Figure 25:
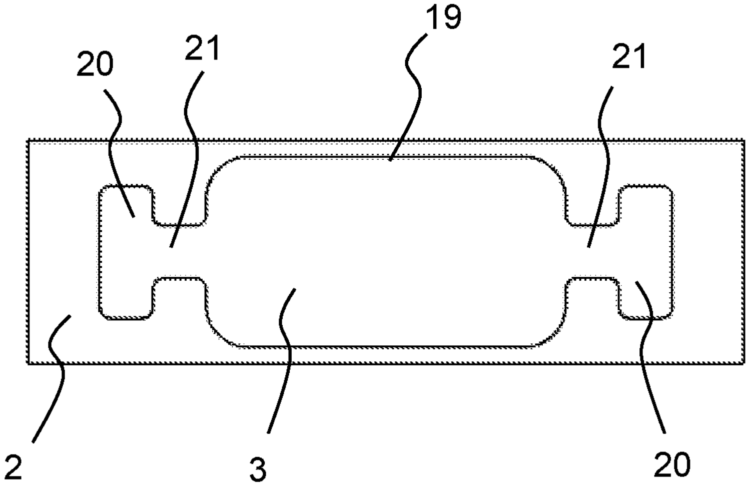
FIG. 25 shows a top view of the busbar from FIG. 24.

FIG. 25 shows a top view of busbar 2 from FIG. 24. It is apparent that busbar 2 extends in the longitudinal direction and has a width which is significantly narrower than the longitudinal extension. Fixing openings 20 are rectangular openings which extend transversely to the longitudinal extension direction with respect to their longitudinal direction. These rectangular fixing openings 20 are then connected to through-opening 3 via a narrow channel 21.

Other contours of fixing opening 20 and channel 21 are equally possible, such as polygonal or circular fixing openings.

Figure 26:
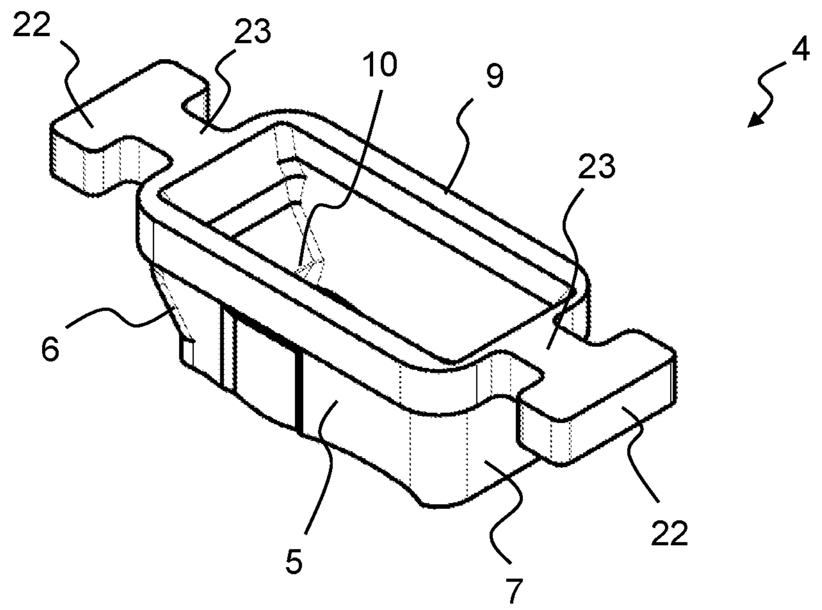
FIG. 26 shows a perspective view of a sleeve, including fixing projections.

FIG. 26 shows a perspective view of a sleeve 4 having fixing projections 22, which are connected to collar 9 of sleeve 4 via a crosspiece 23. In the illustrated exemplary embodiment, two crosspieces 23, facing away from each other, with fixing projections 22 adjoined thereto, are present. The contours of fixing projections 22 with crosspieces 23 correspond to the contours of fixing openings 20 and channel 21, so that fixing projections 22 with crosspiece 23 may each be inserted in a fitting manner via an assigned fixing opening 20 with channel 21.

Moreover, sleeve 4 is designed in the way already described for the previous exemplary embodiments.

Figure 27:
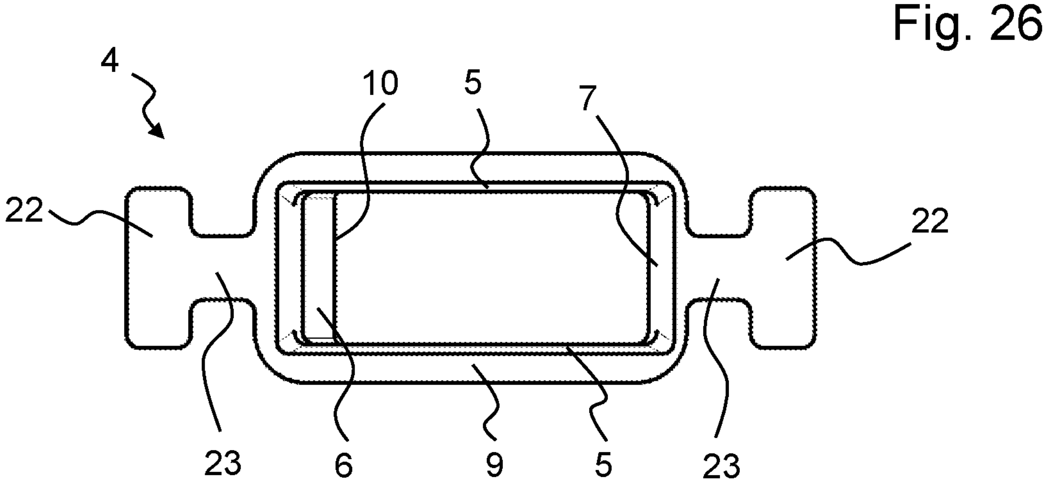
FIG. 27 shows a top view the sleeve from FIG. 27.

FIG. 27 shows a top view of sleeve 4 having the two fixing projections 22, which extend way from each other in the longitudinal direction and are each connected to collar 9 of sleeve 4 via a crosspiece 23.

Figure 28:
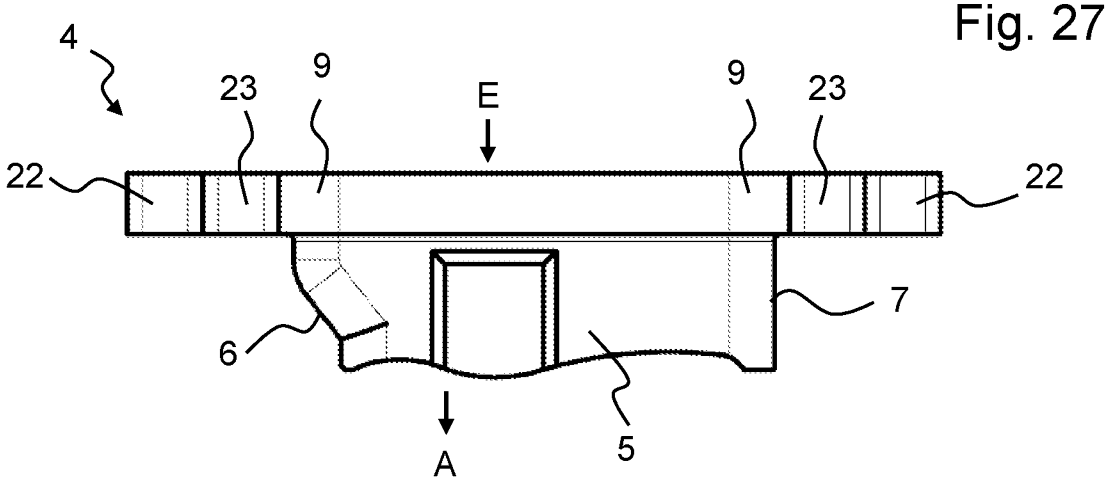
FIG. 28 shows a side view of the sleeve from FIG. 26.

FIG. 28 shows a side view of sleeve 4, including further fixing projections 22 narrower crosspiece 23 situated in each case between a fixing projection 22 and collar 9.

Figure 29:
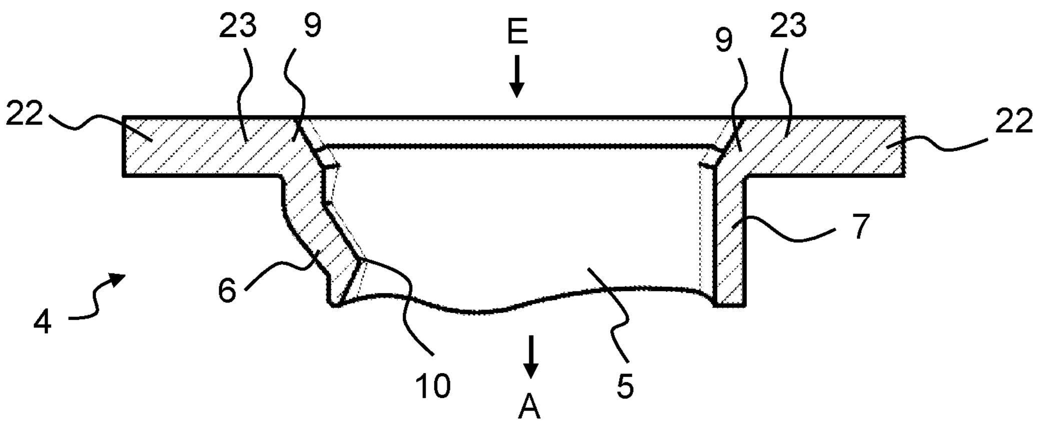
FIG. 29 shows side sectional view of the sleeve from FIG. 26.

FIG. 29 shows a side sectional view of sleeve 4 from FIG. 26 through 28. It is clear that collar 9 extends through adjoining crosspieces 23 and fixing projections 22 in the longitudinal direction, in the viewing direction from right to left and vice versa farther than in the case of the specific embodiments of sleeve 4 described first.

It is furthermore apparent that sleeve walls 5, 6, 7 extend away from inlet E to outlet A transversely to the plane formed and spanned by collar 9 and crosspieces 23 and fixing projections 22 adjoined thereto.

Figure 30:
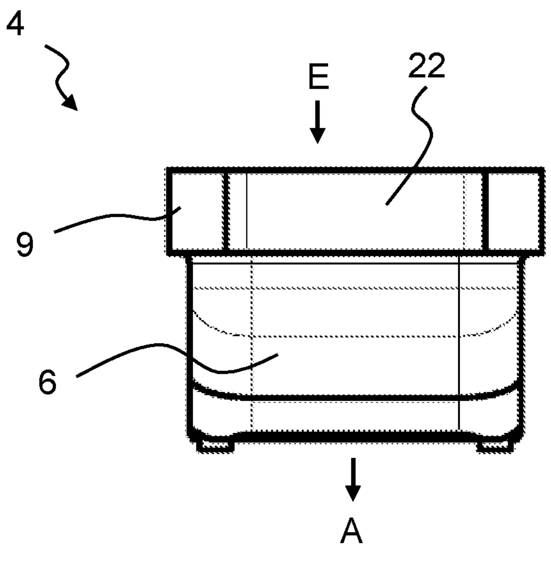
FIG. 30 shows a front view of the sleeve from FIG. 26.

FIG. 30 shows a front view of narrow side wall 6, including collar 9 and fixing projection 22 adjoined thereto. It is apparent that the width of fixing projection 22 is smaller than the total width of sleeve 4, which is determined by the outer edges of collar 9.

Figure 31:
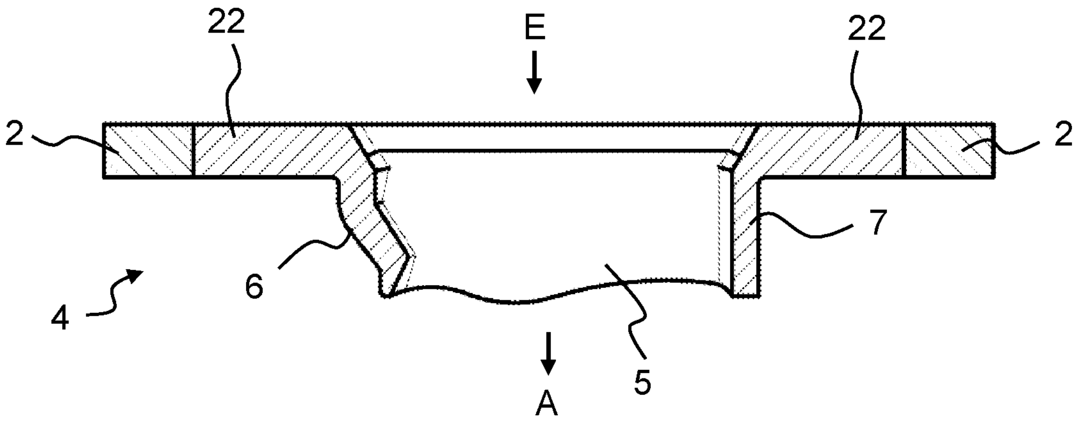
FIG. 31 shows a side sectional view of the busbar from FIGS. 24 and 25, including the sleeve from FIG. 26 inserted therein.

FIG. 31 shows spring-force clamping connection 1, including busbar 2 and sleeve 4 inserted therein of the type described above and correspondingly shown in FIG. 29. It is apparent that fixing projections 22 are again received in a form-fitting manner in fixing openings 20 of busbar 2, and sleeve walls 5, 6, 7 extend downwardly out of the plane of busbar 2 from inlet E to outlet A transversely to the plane of busbar 2 and fixing projections 22.

Figure 32:
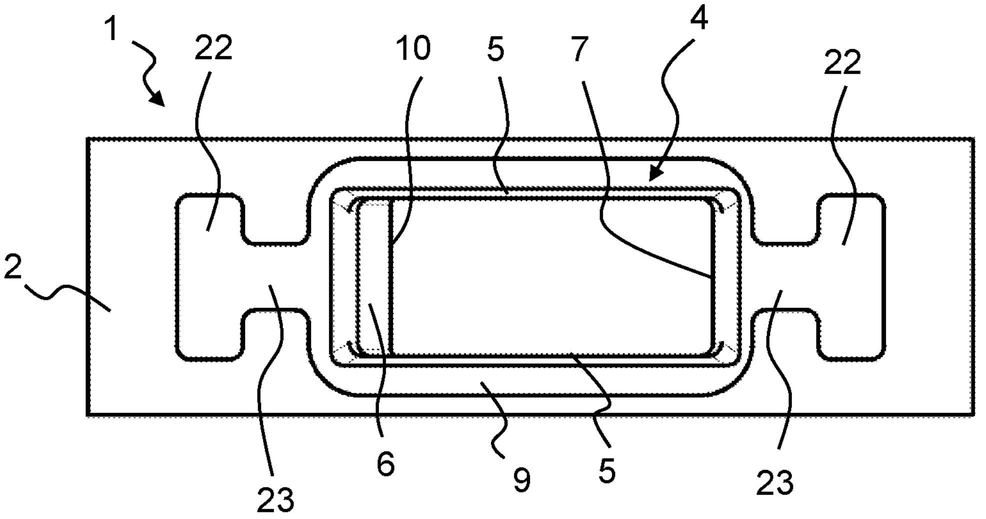
FIG. 32 shows a top view of the busbar, including the sleeve from FIG. 31 inserted therein.

FIG. 32 shows a top view of spring-force clamping connection 1 from FIG. 31. Sleeve 4 is fitted into opening 3 with its collar 9. In addition, crosspieces 23 adjoining in the longitudinal direction are fitted into channels 21 and fixing openings 20 with their fixing projections 22. The surface area for connecting sleeve 4 to busbar 2 is significantly enlarged in this way compared to the exemplary embodiments described first. Sleeve 4 may thus be held even more securely on busbar 2 in a friction-fitting manner. Alternatively, the connection between busbar 2 and sleeve 4 may take place only via fixing openings 20 and fixing projections 22, so that sleeve 4 dies not have any contact to the inner circumferential wall of through-opening 3 or abuts the inner wall of through-opening 3 without any or without significant pressure force.

Figure 33:
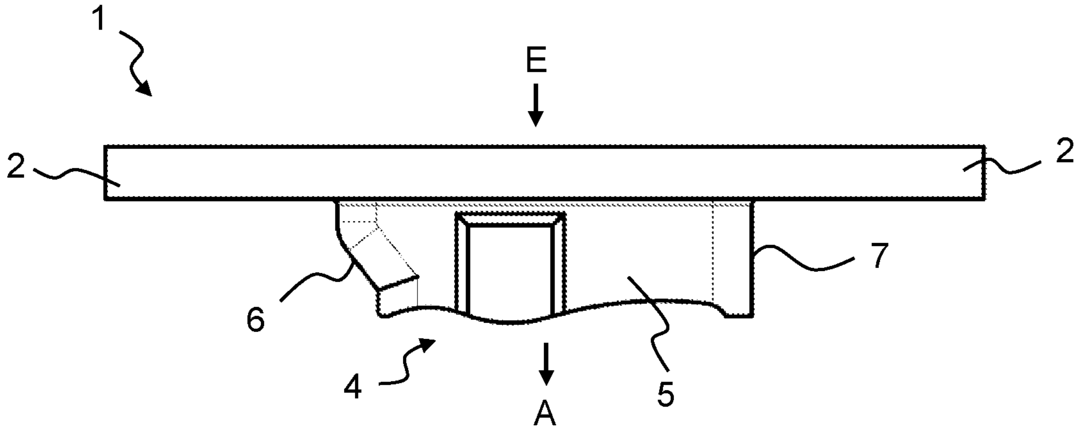
FIG. 33 shows a side view of the busbar, including the sleeve from FIGS. 31 and 32 inserted therein.

FIG. 33 shows a side view of spring-force clamping connection 1 from FIG. 32, including busbar 2 and sleeve 4 inserted therein. The fitting of sleeve 4 by fixing projections 22 is no longer apparent in the side view.

Figure 34:
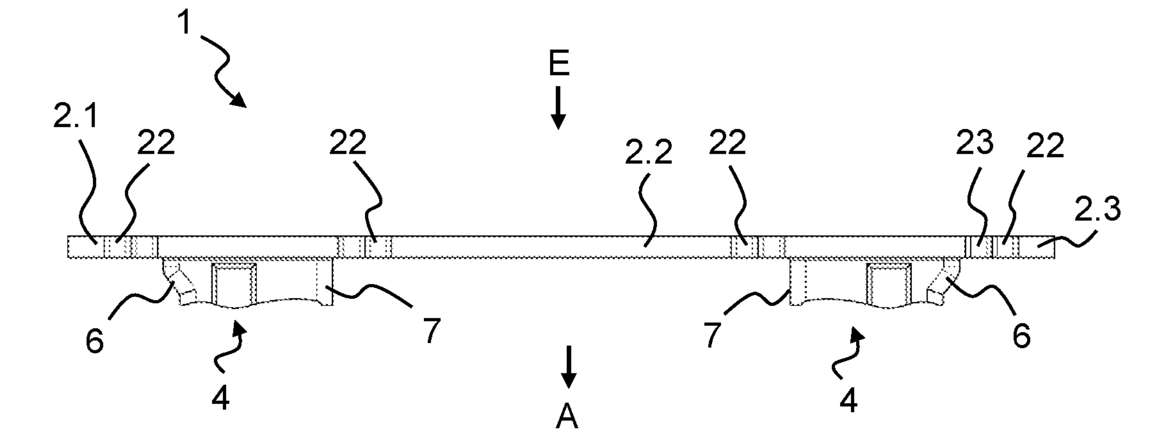
FIG. 34 shows a side view of a multi-part busbar, including sleeves connecting the busbar parts.

FIG. 34 shows a side view of a specific embodiment including a multi-part busbar 2. It is made up of multiple separate busbar parts 2.1, 2.2, 2.3, two parts 2.1 and 2.2 or 2.2 and 2.3 of a busbar 2 each being connected to each other by a sleeve 4. For this purpose, sleeve 4 is then connected to the narrow sides of busbar 2. For this purpose, sleeve 4 is joined to the free ends of one particular part 2.1, 2.2, 2.3 of a busbar 2. This may again take place by form- and force-fitting connections with the aid of a fixing projection 22, which is formed on collar 9 of sleeve 4 with the aid of a crosspiece 23. The width of sleeve 4 also essentially corresponds to the width of busbar 2. Collar 9 of the sleeve is advantageously widened in the width direction for this purpose.

A multiple spring-force clamping connection 1 having two sleeves 4 is shown in the illustrated exemplary embodiment, whose narrow side walls 6 provided for clamping the electrical conductor face away from each other. Opposite narrow side walls 7 are arranged adjacent to each other. Electrical conductors may thus be inserted on two sides from opposite directions in each case and be clamped, as is customary, for example, in terminal strips. However, multiple spring-force clamping connections having more than two sleeves 4 are also conceivable.

A multiple spring-force clamping connection 1 of this type may be assembled from different parts based on the principle of modular construction. Parts 2.1, 2.2, 2.3 of busbar 2 may be formed as needed, so that different curved and oriented spring-force clamping connections are assembled from a modular system as needed.

Figure 35:
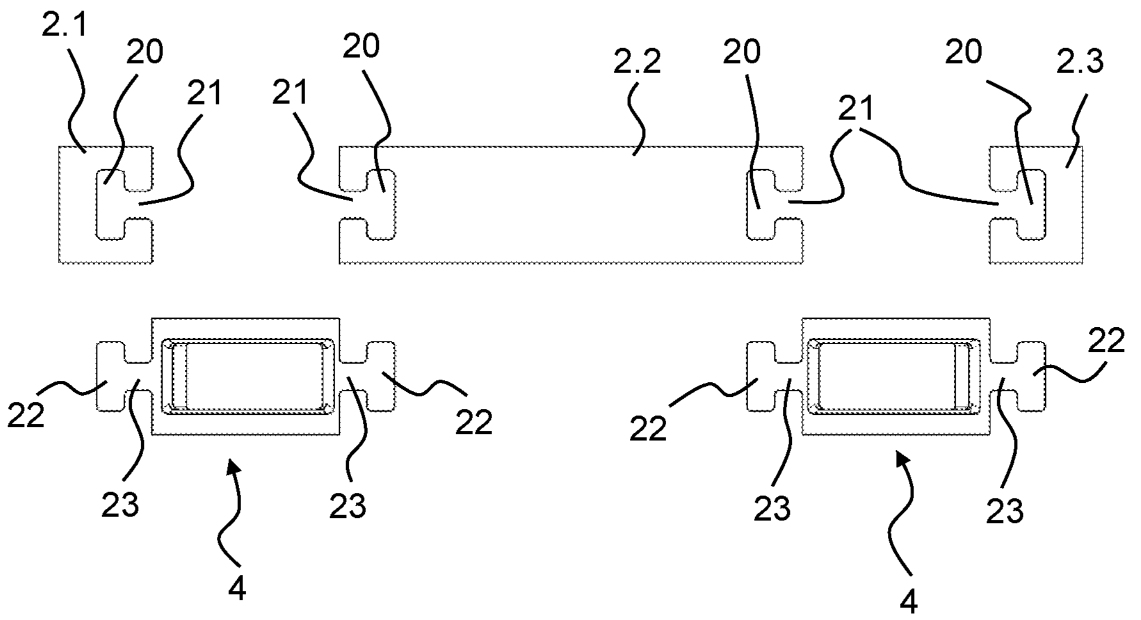
FIG. 35 shows a top view of the multi-part busbar, including fixing openings in the end regions and sleeves with fixing projections connecting them.

FIG. 35 shows a top view of a conductor terminal 11 in an exploded view. It is apparent that the separate parts of busbar 2 each have widened fixing openings 20 with channels 21 leading thereinto in at least one end region. Channels 21 are open in the direction of the narrow end of busbar part 2.

A busbar part 2 may have a fixing opening 20 with channel 21 leading thereinto only on one side, e.g., on one end. However, it is also conceivable that a busbar part 2 has a fixing opening 20 with a narrower channel 21 protruding therefrom on two opposite ends.

Sleeve 4 provided with fixing projections 22, as was described with reference, in particular, to FIGS. 26 through 30, may now be connected to a part of a busbar 2 by one end in each case. Fixing projections 22 with adjoining crosspieces 23 are pressed by a press fit into assigned fixing opening 20 and associated channel 21 of a part of a busbar 2.

It is again conceivable to insert fixing projections 22 into fixing openings 22 with clearance and to also provide a clearance to the channel walls of channel 21 in the case of crosspiece 23. The connection of sleeve 4 to a part of busbar 2 may then take place, for example, by integral joining (e.g., welding, soldering, and the like).

In this variant, a connection is also conceivable using a further form fit in the direction of the degree of freedom transversely to the busbar plane of busbar 2, i.e., in the viewing direction of FIG. 35. A stop to the upper side of busbar 2 could be formed for this purpose. It is conceivable to form a stop on the underside by means of a projection formed after insertion or by a latched connection. A stop on sleeve 4 by a projection or a latching element may also be present, which is temporarily displaced during insertion and then springs back elastically into a stop position.

An exact, burr-free manufacturing of the surfaces to be pressed is advantageous for pressing sleeve 4 into through-opening 3 of busbar 2. The pressing requirement in may be reduced by a ribbing. The edge crosspieces of busbar 2 and collar 9 of sleeve 4 may have a sufficient wall thickness to avoid bending during pressing. It is advantageous to provide only a press fit or to introduce sleeve 4 into through-opening 3 with clearance and to connect sleeve 4 to busbar 2 integrally, for example by laser welding.

Described sleeves 4 may now be manufactured as standardized single parts or be used as components of a modular system. Simpler and more cost-effective tools may be used, since the entire conductor terminal geometry, including the tool, no longer has to be manufactured, but instead only a sleeve 4 must be installed in a busbar 2. Sleeve 4 may be supplied as bulk material.

The outer surface of sleeve 4 and the inner surface of, for example stamped-out, through-opening 3 of busbar 2 may be used as surfaces to be pressed together, whereby existing geometries may be used for the pressing. This reduces the complexity of the components.

Busbar 2 no longer has to be coated as a whole but may remain uncoated or be fused tin-plated. The manufactured busbar 2 may therefore be supplied directly for mounting in insulating housing 12.

Busbar 2 may be made from a different material than sleeve 4, for example from aluminum to lower costs.

In designing busbar 2, the manufacturability of the passages no longer has to be taken into account. As a result, busbar 2 may be manufactured from a significantly thicker or thinner sheet metal than if a passage is an integral part of busbar 2 and must be manufactured therewith as a single piece.

Due to separate sleeve 4, busbar 2 may be manufactured using production technologies which up to now have been unsuitable for manufacturing complex geometries, for example from copper material by selective laser sintering.

Sleeve 4 may be coated with a different material than busbar 2, for example with silver or gold. Sleeve 4 may thus be adapted to special applications, such as the connection of aluminum conductors.

Sleeves 4 having different coatings and designs may be installed in one busbar 2 to permit the connection of different conductors or to meet different connection conditions. For example, copper and aluminum conductors on a common busbar 2 may be permitted, each having a special sleeve 4 designed for it.

It is advantageous if busbar 2 and/or sleeve 4 is/are made from a copper alloy. The reaction properties after pressing sleeve 4 into busbar 2 may be improved.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A spring-force clamping connection comprising:

a busbar that spans a busbar plane and has a through-opening;

a clamping spring; and a separate sleeve being connected to the busbar and having a sleeve wall, which extends from an inlet to an outlet of the sleeve in a sleeve longitudinal direction, the separate sleeve being inserted into the through-opening in the sleeve longitudinal direction transversely to the busbar plane, the sleeve wall having an outer circumferential contour, which, in the state of the sleeve inserted into the through-opening, abuts an inner circumferential contour of the through-opening.

2. The spring-force clamping connection according to claim 1, wherein the sleeve is connected to the busbar in a force-fitting manner.

3. The spring-force clamping connection according to claim 2, wherein that the sleeve is pressed together with the busbar.

4. The spring-force clamping connection according to claim 1, wherein the sleeve is integrally connected to the busbar.

5. The spring-force clamping connection according to claim 1, wherein the sleeve is connected to the busbar in a form-fitting manner.

6. The spring-force clamping connection according to claim 1, wherein the sleeve extends along the inner circumference of the through-opening over a range of at least 180°.

7. The spring-force clamping connection according to claim 6, wherein the sleeve forms a U-shaped frame in cross section, which has two diametrically opposed narrow side walls and one longitudinal side wall connecting the narrow side walls, the longitudinal side wall being longer than one of the narrow side walls.

8. The spring-force clamping connection according to claim 1, wherein the sleeve forms a rectangular frame in cross section, which has two diametrically opposed narrow side walls and longitudinal side walls connecting the narrow side walls, the longitudinal side walls being longer than one of the narrow side walls.

9. The spring-force clamping connection according to claim 7, wherein at least one of the narrow side walls has an inclination oriented from the inlet at the busbar plane to the outlet in the direction of the opposite narrow side wall.

10. The spring-force clamping connection according to claim 1, wherein the sleeve extends along the circumference of the through-opening over a range of at least 360°.

11. The spring-force clamping connection according to claim 10, wherein the outer circumferential contour of the sleeve corresponds to the inner circumferential contour of the through-opening over the entire circumference, and wherein the sleeve abuts the busbar over the entire circumference.

12. The spring-force clamping connection according to claim 1, wherein the busbar has a greater wall thickness than a wall thickness of the sleeve wall.

13. The spring-force clamping connection according to claim 1, wherein the sleeve wall has a separating slit extending in the sleeve longitudinal direction in a section which is not designed to clamp the electrical conductor to the sleeve wall with the aid of the clamping spring.

14. The spring-force clamping connection according to claim 13, wherein the separating slit extends continuously from the inlet to the outlet of the sleeve.

15. The spring-force clamping connection according to claim 1, wherein a fixing opening is arranged adjacent to the through-opening, which is connected to the through-opening by a channel, and wherein the sleeve has a fixing projection with a fixing contour corresponding to the circumferential contour of the fixing opening, and wherein the fixing projection is connected to the sleeve wall by a crosspiece insertable into the channel.

16. The spring-force clamping connection according to claim 15, wherein two diametrically opposed fixing openings are arranged at a common through-opening, and wherein the sleeve has two diametrically opposed crosspieces extending in opposite directions from each other with fixing projections formed thereon.

17. The spring-force clamping connection according to claim 16, wherein the busbar has multiple parts, and wherein a busbar integrally joined together with the sleeve is formed by inserting the fixing projections into a particular fixing opening and by connection to the particular part of the busbar at the fixing projections.

18. The spring-force clamping connection according to claim 1, wherein the sleeve is formed from a different material than the busbar.

19. The spring-force clamping connection according to claim 1, wherein the outer surface of the sleeve and/or the inner surface of the busbar bordering the through-opening has an embossed surface structure.

20. A conductor terminal comprising:

an insulating housing; and a spring-force clamping connection according to claim 1, the spring-force clamping connection being arranged in the insulating housing, wherein the insulating housing has a conductor insertion opening leading to the inlet of the sleeve.

21. A method for manufacturing a spring-force clamping connection according to claim 1, the method comprising:

stamping or cutting out a through-opening in the busbar;

forming a semi-finished sheet metal product to create a sleeve with a sleeve wall, which extends from an inlet to an output of the sleeve in a sleeve longitudinal direction;

inserting the sleeve into the through-opening of the busbar such that the sleeve longitudinal direction is oriented transversely to the busbar; and joining the sleeve to the busbar.

22. The method according to claim 21, wherein the joining of the sleeve to the busbar takes place by fitting, welding, soldering, latching, or caulking.

* * * * *